United States Patent [19]

Kennedy et al.

[11] Patent Number: 5,733,135
[45] Date of Patent: Mar. 31, 1998

[54] AIR BAG INFLATOR ASSEMBLY WITH SHORTING CLIP

[75] Inventors: Peter A. Kennedy, Scottsdale; Brian R. Pitstick, Mesa; Todd R. Bailey, Higley, all of Ariz.

[73] Assignee: TRW Inc., Lyndhurst, Ohio

[21] Appl. No.: 567,957

[22] Filed: Dec. 6, 1995

[51] Int. Cl.$^6$ .................................................. H01R 29/00
[52] U.S. Cl. .................................................. 439/188
[58] Field of Search ............................. 439/188; 200/51.1

[56] References Cited

U.S. PATENT DOCUMENTS

| | | | |
|---|---|---|---|
| 4,906,203 | 3/1990 | Margrave et al. | 439/188 OR |
| 5,178,547 | 1/1993 | Bonas et al. | |
| 5,241,910 | 9/1993 | Cunningham et al. | |
| 5,263,872 | 11/1993 | Marpoe, Jr. et al. | 439/188 OR |
| 5,275,575 | 1/1994 | Cahaly et al. | |
| 5,277,608 | 1/1994 | Oda | 439/188 OR |
| 5,295,846 | 3/1994 | Sumida et al. | 439/188 OR |
| 5,314,345 | 5/1994 | Cahaly et al. | |

Primary Examiner—P. Austin Bradley
Assistant Examiner—Daniel Wittels
Attorney, Agent, or Firm—Tarolli, Sundheim, Covell Tummino & Szabo

[57] ABSTRACT

An air bag inflator (10) includes an igniter (142) for actuating the inflator in response to receiving an electrical signal. The igniter (142) has a pair of electrical terminals (144, 146) for electrical contact with an electrical connector (152) to receive the electrical signal from the electrical connector. A retainer (150) supports the igniter (142) adjacent the inflator (10). A shorting clip (200) establishes a short circuit between the terminals (144, 146) of the igniter (142) when the electrical connector (152) is not in electrical contact with the terminals. A crimp portion (180) of the retainer (150) engages the shorting clip (200) to block movement of the shorting clip relative to the retainer. The shorting clip (200) includes means (240, 242) for maintaining the electrical connector (152) in electrical contact with the electrical terminals (144, 146). Different shorting clips (200, 420) can alternatively be used with the same retainer (150) and igniter (142), to enable the inflator (10) to be electrically connected with different electrical connectors (152, 410).

13 Claims, 6 Drawing Sheets

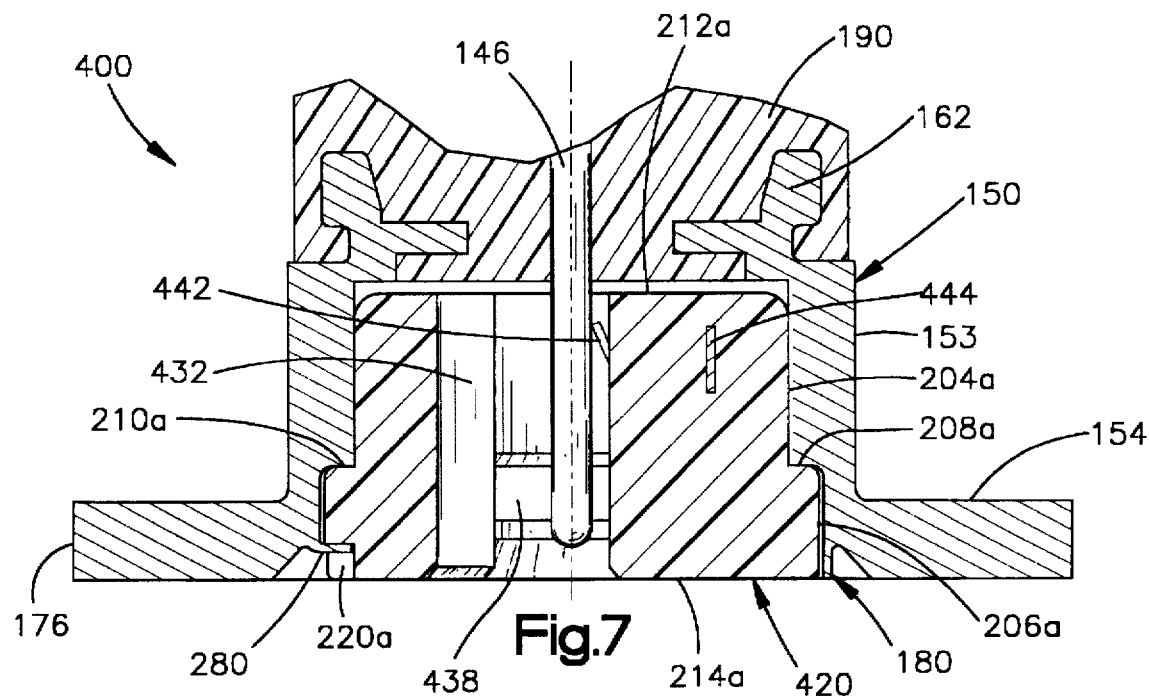
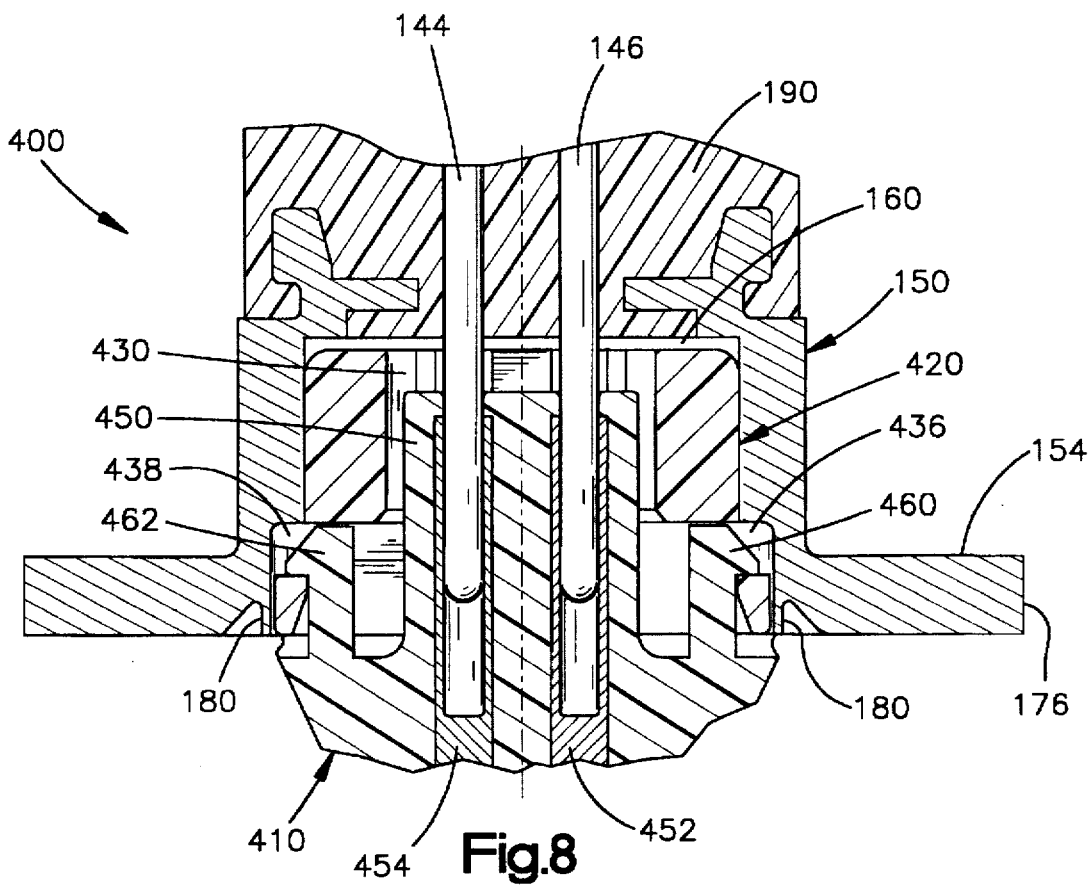

AIR BAG INFLATOR ASSEMBLY WITH SHORTING CLIP

BACKGROUND OF THE INVENTION

1. Technical Field

The present invention relates to an apparatus for association with an electrical connector. The present invention relates particularly to an inflator for providing inflation fluid to inflate an air bag in response to receiving an electrical signal through an electrical connector.

2. Description of Prior Art

It is well known to protect a vehicle occupant by an air bag that is inflated when the vehicle decelerates suddenly, as in a collision. The air bag is inflated by inflation fluid from an air bag inflator. The inflation fluid is released from a container in the inflator and/or generated by ignition of combustible gas generating material in the inflator. The inflator uses an electrically actuatable initiator to open the container and/or to ignite the gas generating material.

A typical initiator in an air bag inflator has two terminals. The terminals are in electrical contact with an electrical connector which is part of vehicle electric circuitry including a deceleration sensor. Upon deceleration of the vehicle at a rate above a predetermined rate, the deceleration sensor closes and completes a circuit to permit an electric signal to pass through the electrical connector and the terminals to the initiator. The electric signal actuates the initiator, resulting in actuation of the inflator.

A typical initiator includes a metal retainer which physically maintains the electrical connector in electrical contact with the terminals of the initiator. Prior to connection of the electrical connector with the terminals, a shorting clip connected between the terminals prevents accidental actuation of the initiator. The shorting clip is engageable with the metal retainer to hold the shorting clip in position on the initiator.

SUMMARY OF THE INVENTION

The present invention is an apparatus for association with an electrical connector and for, when actuated, initiating actuation of an inflator for discharging inflation fluid to inflate a vehicle occupant restraint such as an air bag. The apparatus comprises an initiator actuatable to initiate actuation of the inflator in response to receiving an electrical signal. The initiator has a pair of electrical terminals for electrical contact with the electrical connector to receive the electrical signal from the electrical connector. The apparatus includes a retainer for supporting the initiator adjacent the inflator. The apparatus also includes a shorting clip for establishing a short circuit between the electrical terminals of the initiator when the electrical connector is not in electrical contact with the electrical terminals. The apparatus further includes means for attaching the shorting clip to the initiator, comprising a crimp portion of the retainer which engages the shorting clip to block movement of the shorting clip relative to the retainer. In a preferred embodiment of the invention, the shorting clip includes means for maintaining the electrical connector in electrical contact with the electrical terminals. Different shorting clips can be alternatively be used with the same retainer and initiator, to enable the inflator to be electrically connected with different electrical connectors.

BRIEF DESCRIPTION OF THE DRAWINGS

Further features of the present invention will become apparent to those skilled in the art to which the present invention relates from reading the following specification with reference to the accompanying drawings, in which:

FIG. 7 is a view generally similar to FIG. 4 illustrating portions of the second initiator assembly in a condition after/assembly of the shorting clip into the retainer; and;

FIG. 8 is a view similar to FIG. 5 and illustrating the second electrical connector in position on the second initiator assembly.

DESCRIPTION OF THE PREFERRED EMBODIMENT OF THE INVENTION

The present invention relates to an air bag inflator for discharging inflation fluid to inflate an air bag to protect an occupant of a vehicle when the vehicle is involved in a collision. The present invention is applicable to various inflator constructions, including inflators of different shapes and sizes and inflators with different modes of operation. For example, the invention can be applied to inflators which release inflation fluid from a container and/or which generate inflation fluid by ignition of combustible gas generating material.

Figure 1:
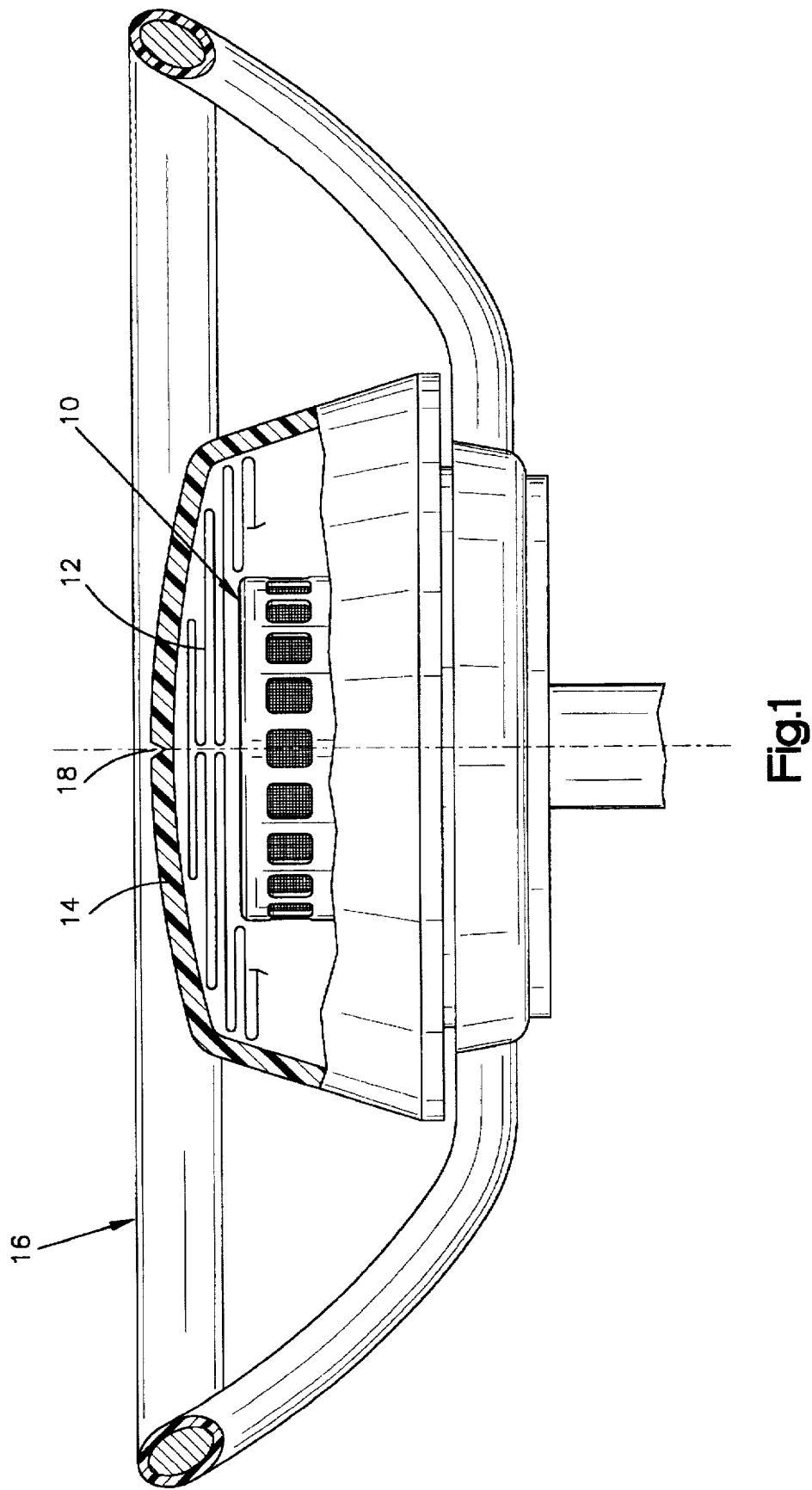
FIG. 1 is a transverse view, partially in section, of a vehicle steering wheel with an inflatable occupant restraint module incorporating an inflator that uses an initiator assembly constructed in accordance with the present invention.

As representative of the present invention, FIG. 1 illustrates an inflator 10. An air bag 12 is folded around the inflator 10. A cover 14 encloses the air bag 12 and the inflator 10. The inflator 10, the air bag 12, and the cover 14 are components of a module which is mounted on a vehicle steering wheel 16.

Upon the occurrence of a vehicle collision, the inflator 10 is actuated and discharges a large volume of gas. The inflation fluid from the inflator 10 expands the air bag 12. As the air bag 12 starts to expand, it breaks weakened portions in the cover 14. One of the weakened portions is designated 18 in FIG. 1. As the air bag 12 continues to expand, it moves into the space between the driver of the vehicle and the steering wheel 16 to help protect the driver.

The inflator 10 (FIG. 2) includes a housing 40. The housing 40 is made of three pieces, namely, a diffuser cup 42, a combustion cup 44, and a combustion chamber cover 46. The diffuser cup 42, the combustion cup 44, and the combustion chamber cover 46 are made of a metal, such as UNS S30100 stainless steel.

The diffuser cup 42 is generally cup-shaped and has a cylindrical side wall 50 extending around the central axis 52 of the inflator 10. The side wall 50 extends between a flat upper end wall 54 and a flat lower flange 56. An inner annular surface 55 on the upper end wall 54 of the diffuser cup 42 defines a central opening 57 in the upper end wall 54 of the diffuser cup 42. The end wall 54 and the flange 56 are generally parallel to each other and perpendicular to the axis 52. An annular array of gas outlet openings 58 is located in an upper portion of the diffuser cup side wall 50.

The combustion cup 44 is generally cup-shaped and is disposed inside the diffuser cup 42. The combustion cup 44 has a cylindrical side wall 60 extending around the axis 52. The cylindrical side wall 60 extends between a flat upper end wall 64 and a flat lower flange 66. The upper end wall 64 and the lower flange 66 are generally parallel to each other and perpendicular to the axis 52. An annular array of openings 68 is located in a lower portion of the combustion side wall 60.

The upper end wall 64 of the combustion cup 44 is welded with a continuous weld to the annular surface 55 on the upper end wall 54 of the diffuser cup 42 at a circumferential weld location 70, preferably by laser welding. The combustion cup flange 66 is welded with a continuous weld to the diffuser cup flange 56 at a circumferential weld location 72, also preferably by laser welding.

The combustion chamber cover 46 is a generally flat metal piece having a circular center portion 80 and a parallel but slightly offset circular outer flange 82. A circular opening 84 is located in the center portion 80 of the chamber cover 46. The outer flange 82 of the chamber cover 46 is welded with a continuous weld to the combustion cup flange 66 at a circumferential weld location 86, again preferably by laser welding.

A hermetically sealed canister 90 is disposed in the combustion cup 44. The canister 90 is made of two pieces, namely a lower canister section 92 and a cover 94. The radially outer edge of the canister cover 94 is crimped to an adjacent edge of the canister lower section 92 to seal the canister 90 hermetically. The canister 90 is preferably made of relatively thin aluminum.

The canister lower section 92 has a cylindrical outer side wall 96 adjacent to and inside the combustion cup side wall 60. The side wall 96 has a reduced thickness in the area adjacent the openings 68 in the combustion cup side wall 60. The canister lower section 92 also has a cylindrical inner side wall 98 spaced radially inwardly from the outer side wall 96. The side wall 98 has a reduced thickness in the area adjacent an igniter 142.

A flat ring-shaped lower wall 100 of the canister lower section 92 interconnects the outer side wall 96 and the inner side wall 98. A circular inner top wall 102 of the canister lower section 92 extends radially inwardly from and caps the inner side wall 98. The inner top wall 102 and the cylindrical inner side wall 98 define a downwardly opening central recess 104 in the canister 90.

The canister cover 94 is generally circular in shape. A recess 106 is located in the center of the canister cover 94. A packet 108 of auto ignition material is located in the recess 106 and held in the recess 106 by a piece of aluminum foil tape 109.

A plurality of annular disks 110 of gas generating material are stacked atop each other within the canister 90. An annular cushion 112 is disposed between the uppermost gas generating disk 114 and the inside of the canister cover 94. The disks 110 are made of a known material which when ignited generates nitrogen gas. Although many types of gas generating material could be used, suitable gas generating materials are disclosed in U.S. Pat. No. 3,895,098.

An annular prefilter 120 is disposed in the canister 90. The prefilter 120 is located radially outward of the gas generating disks 110 and radially inward of the outer side wall 96 of the canister 90. A small annular space exists between the prefilter 120 and the outer side wall 96.

An annular slag screen indicated schematically at 122 is located in the diffuser cup 42, outside of the combustion cup 44. The slag screen 122 is radially outward of the openings 68 and lies against the combustion cup side wall 60. However, the slag screen 122 could be spaced away from the openings 68 in the combustion cup side wall 60.

An annular final filter assembly indicated schematically at 124 is located inside the diffuser cup 42 above the slag screen 122. The final filter assembly 124 10 is radially inward of the gas outlet openings 58 in the side wall 50 of the diffuser cup 42. The final filter assembly 124 is a plurality of layers of various materials. The layers extend around the diffuser cup side wall 50 and are located inside the side wall. The detailed structure of the final filter assembly 124 does not form a part of the present invention and therefore will not be described in detail.

An annular filter shield 126 projects radially inwardly from the diffuser cup side wall 50 and separates the final filter assembly 124 and the slag screen 122. An annular graphite seal 128 seals the gap between the upper edge of the final filter assembly 124 and the inside of the diffuser upper end wall 54. Another annular graphite seal 130 seals the gap between the lower edge of the final filter assembly 124 and the upper side of the filter shield 126.

The inflator 10 includes an initiator assembly 140. The initiator assembly 140, which includes the igniter 142, projects through the opening 84 in the chamber cover 46 into the central recess 104 of the canister 90. The initiator assembly 140 is welded with a continuous weld, preferably a laser weld, to the center portion 80 of the chamber cover 46 at a circumferential weld location 143. The initiator assembly 140 is connected with vehicle electric circuitry including an electrical connector 152 in a manner described below.

The igniter 142 of the initiator assembly 140 (FIGS. 2-5) may be of any suitable well known construction and includes a resistance wire (not shown) embedded in a known ignition material (not shown) in the igniter 142. The igniter 142 has a pair of terminals in the form of cylindrical metal pins 144 and 146. The terminals 144 and 146 are connected to the resistance wire in the igniter 142. When the inflator 10 is mounted in the vehicle, the terminals 144 and 146 are electrically connected with the electrical connector 152 (FIGS. 3 and 4) in a manner described below. The electrical connector 152 is connected to vehicle electric circuitry (not shown), including a sensor such as an accelerometer, for receiving an electrical signal to actuate the igniter 142. The electrical connector 152 is a commercially available part and is typically supplied by the manufacturer of the vehicle in which the inflator 10 is mounted.

As known in the art, the sensor senses a vehicle condition that indicates the occurrence of a vehicle collision. If the vehicle condition sensed by the sensor is above a predetermined threshold level, it indicates the occurrence of a collision having at least a predetermined threshold level of severity. The threshold level of collision severity is a level at which inflation of the air bag 12 is desired for protection of a vehicle occupant. The sensor then provides a collision signal which is transmitted through the electrical connector 152 and through the terminals 144 and 146 to the igniter 142.

The resistance wire in the igniter 142 heats up and sets off the ignition material which deflagrates a charge in the igniter 142. Deflagration of the charge forms hot combustion products which flow outwardly from the igniter 142 and rupture the inner top wall 102 and the inner side wall 98 of the canister 90. The hot combustion products from the igniter 142 ignite the disks 110 of gas generating material. The disks 110 of gas generating material rapidly produce a large volume of another hot gas.

The pressure of the gas acts on the cylindrical side wall 96 of the canister 90, forcing the side wall 96 radially outwardly against the combustion cup side wall 60. This results in the thin side wall 96 of the canister 90 being ruptured or blown out at the openings 68 in the combustion cup side wall 60. The reduced thickness of the side wall 96 adjacent the openings 68 allows this portion of the side wall 96 to rupture in preference to other portions at a desired pressure. The gas generated by burning of the disks 110 then flows radially outwardly through the prefilter 120. The prefilter 120 removes from the flowing gas some combustion products of the initiator assembly 140 and of the gas generating disks 110. The prefilter 120 also cools the flowing gas. When the gas cools, molten products are plated onto the prefilter 120. The gas flows through the openings 68 and into the slag screen 122.

The slag screen 122 removes and traps particles from the flowing gas. The slag screen also cools the flowing gas. When the gas cools, molten combustion products are plated onto the slag screen 122. The filter shield 126 between the slag screen 122 and the final filter assembly 124 causes turbulent flow of gas to occur in and around the slag screen 122. The turbulent gas flow promotes the retention of relatively heavy particles in the slag screen 122 and in the lower portion of the diffuser cup 42.

The gas flows axially upwardly from the slag screen 122 to the final filter assembly 124. The gas then flows radially outwardly through the final filter assembly 124 which removes small particles from the gas. The final filter assembly 124 also further cools the gas so that molten products in the gas may deposit on parts of the final filter assembly 124. The annular array of gas outlet openings 58 directs the flow of gas into the air bag 12 to inflate the air bag 12.

In addition to the igniter 142, the initiator assembly 140 includes a retainer 150 (FIGS. 2–4) for securing the igniter to the housing 40 of the inflator 10. The retainer 150 is preferably made of a weldable metal suitable for cold heading, such as UNS S30430 stainless steel.

The retainer 150 includes a tubular, axially extending socket portion 153 and an annular, radially extending flange portion 154 at one end of the socket portion. The socket portion 153 has cylindrical outer and inner circumferential surfaces 156 and 158 centered on the axis 52. The socket portion 153 and the flange portion 154 extend circumferentially around a central opening 160 of the retainer. An interlock portion 162 of the retainer 150 extends axially inward (upward as viewed in FIG. 4) from the socket portion 153.

An annular shoulder surface 166 extends radially outward from the inner surface 158 to define a shoulder 170 adjacent the end of the socket portion 153 near the flange portion 154. The flange portion 154 of the retainer 150 has parallel, radially extending inner and outer side surfaces 172 and 174. An annular edge surface 176 extends axially between the inner and outer side surfaces 172 and 174.

A circumferential groove 178 is formed in the outer side surface 174 of the flange portion 154 of the retainer 150. The groove defines a crimp portion 180 of the retainer 150 disposed radially inward of the groove. The crimp portion 180 of the retainer has an annular, ring-shaped configuration and extends 360° as a rim around the central opening 160 in the retainer.

The crimp portion 180 of the retainer 150 has an axially extending, inner circumferential side surface 182 which is centered on the axis 52. An axially extending, outer circumferential side surface 184 extends parallel to the inner side surface 182 and defines the radially inner periphery of the groove 178. The outer side surface 184 is centered on the axis 52. An annular edge surface 186 of the crimp portion 180 of the retainer 100 extends radially between the inner and outer side surfaces 182 and 184.

A body of plastic material 190 encases and is in intimate contact with the interlock portion 162 of the retainer 150 and with the igniter 142. The terminals 144 and 146 of the igniter 142 extend axially from the body of plastic material 190 into the central opening 160 of the retainer 150. The body of plastic material 190 attaches the retainer 150 to the igniter 142. In the preferred embodiment, the body of plastic material 190 is injection molded. One suitable plastic material 190 is nylon 6/6 with a 33% glass fill, which can be obtained from E.I. DuPont de Nemours & Co., under the brand name ZYTEL. Other materials which can be injection molded at low pressures and temperatures and which will adhere to the retainer 150 and to the igniter 142 are also suitable for use. Alternatively, the body of plastic material 190 could be an epoxy adhesive, or another material which is not injection molded.

The initiator assembly 140 includes a shorting clip 200 which serves several functions in the inflator 10. The shorting clip 200 prevents accidental actuation of the igniter 142 prior to engagement of the electrical connector 152 with the initiator assembly 140. The shorting clip 200 also maintains the electrical connector 152 in electrical contact with the electrical terminals 144 and 146 of the igniter 142 after engagement of the electrical connector with the initiator assembly 140.

The shorting clip 200 is a single piece of injection molded plastic material 202 having a generally cylindrical configuration. A cylindrical first outer side surface 204 of the shorting clip 200 extends parallel to the axis 52. A larger diameter cylindrical second outer side surface 206 extends parallel to the first outer side surface 204. A shoulder surface 208 extends radially between the side surfaces 204 and 206 to define an external shoulder 210 on the shorting clip 200. The shorting clip 200 also has parallel, radially extending inner and outer end surfaces 212 and 214.

A pair of recesses 220 and 222 are formed in the outer end surface 214 of the shorting clip 200 at locations about 165° apart from each other around the radially outer periphery of the shorting clip. Each one of the recesses 220 and 222 has the form of a cylindrical segment defined by a semi-circular, radially extending surface 224 and an axially extending, cylindrical surface 226.

The shorting clip 200 has a central opening 230 with a configuration adapted to receive the electrical connector 152. The central opening 230 of the shorting clip 200 is defined generally by a pair of arcuate, axially extending end surfaces 232 and 234 centered on and bowed outwardly from the axis 52, and a pair of arcuate, axially extending side surfaces 236 and 238 which are bowed inwardly toward the axis 52.

A first locking rib 240 is formed on the one side surface 236 of the shorting clip 200. The first locking rib 240 projects from the side surface 236 into the central opening 230 of the shorting clip 200 in a direction toward the axis 52. A second locking rib 242 is formed on the opposite side surface 238. The second locking rib 242 projects from the side surface 238 into the central opening 230 of the shorting clip 200, in a direction toward the axis 52.

A pair of terminal openings 250 extend between the inner end surface 212 of the shorting clip 200 and the central opening 230 of the shorting clip. A pair of metal shorting arms 260 and 262 project from the end surfaces 232 and 234 of the shorting clip 200 into the central opening 230. The shorting arms 260 and 262 are electrically interconnected by a metal connector portion 264 (FIG. 4) in the body of plastic material 202.

To secure the igniter 142 to the retainer 150, the igniter and the retainer are positioned relative to each other in a die (not shown). The terminals 144 and 146 extend into the central opening 160 in the retainer 150. The plastic material 190 in a molten form is injected into the die. The plastic material 190 adheres to the interlock portion 162 of the retainer 150. The plastic material 190 also adheres to the igniter 142 and to the igniter terminals 144 and 146. Although it is not shown, there may be provided a thin layer of epoxy adhesive between the plastic material 190 and the retainer 150 to help ensure a gas-tight seal.

After the igniter 142 is secured to the retainer 150, the retainer is attached to the combustion chamber cover 46 (FIG. 2), preferably by welding. The retainer flange 154 is continuously welded to the cover 46 at the circumferential weld location 143. The cover 46 is then welded to the combustion cup 44. The igniter 142 is thereby secured in position in the inflator 10. It should be noted that the retainer 150 can be secured to the cover 46 by other means. For example, it is contemplated that the retainer 150 and the cover 46 may have complementary threaded portions which permit the retainer and the cover to be screwed together.

The shorting clip 200 is inserted in the central opening 160 in the retainer 150, shortly after the molding process is completed. The external configuration of the shorting clip 200 is adapted to fit closely within the internal configuration of the retainer 150, that is, within the surfaces which define the central opening 160 in the retainer. When the shorting clip 200 is engaged with the retainer 150, the first outer side surface 204 on the shorting clip 200 adjoins the cylindrical inner surface 158 on the retainer 150. The second outer side surface 206 on the shorting clip 200 adjoins the inner side surface 182 of the crimp portion 180 of the retainer 150 and also adjoins the cylindrical inner side surface of the flange portion 154 of the retainer. The external shoulder 210 on the shorting clip 200 engages and is received in the internal shoulder 170 of the retainer 150. The outer end surface 214 of the shorting clip 200 is disposed flush with the outer end surface 174 of the flange portion 154 of the retainer 150.

When the shorting clip 200 is disposed in the central opening 160 in the retainer 150 the electrical terminals 144 and 146 extend through the terminal openings 250 in the shorting clip, into the central opening 230 of the shorting clip. The metal shorting arms 260 and 262 of the shorting clip 200 engage the electrical terminals 144 and 146 of the igniter 142, respectively, and connect them electrically. This connection establishes a short circuit between the electrical terminals 144 and 146 of the igniter 142, when the electrical connector 152 is not in electrical contact with the terminals. The short circuit established by the shorting clip 200 does not extend through the bridgewire of the igniter 142. Accordingly, any stray electrical current which might be applied across the electrical terminals 144 and 146 of the igniter 142 does not result in actuation of the ignition material in the igniter, and thus does not cause actuation of the inflator 10.

Figure 3:
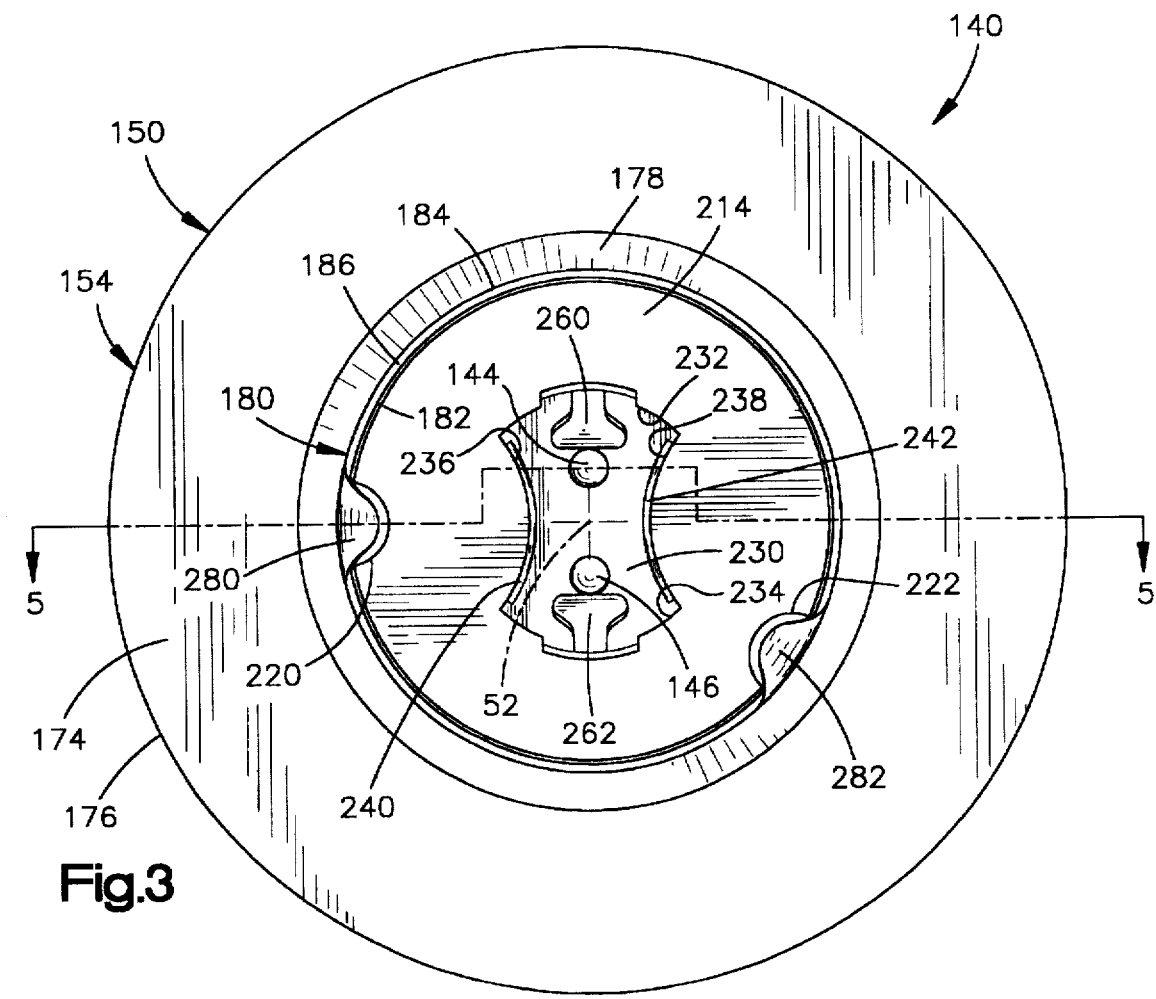
FIG. 3 is a bottom plan view of the initiator assembly of FIG. 2.

The shorting clip 200 is secured in the initiator assembly 140 by the crimp portion 180 of the retainer 150. A pair of spaced segments 280 and 282 of the crimp portion 180 of the retainer 150 are bent or folded radially inward, from the axially extending condition shown in FIG. 4 to a crimped condition as shown in FIG. 3. The segments 280 and 282 of the crimp portion 180 of the retainer 150 are moved into the spaced recesses 220 and 222, respectively, in the shorting clip 200. The radially inward movement of the segments 280 and 282 of the crimp portion 180 of the retainer 150 causes the segments of the crimp portion to overlie and engage the radially extending surfaces 224 of the shorting clip 200, which are disposed in the central opening 160 in the retainer 150. The segments 280 and 282 of the crimp portion 180 also overlie a small portion of the central opening 160 of the retainer 150.

Figure 2:
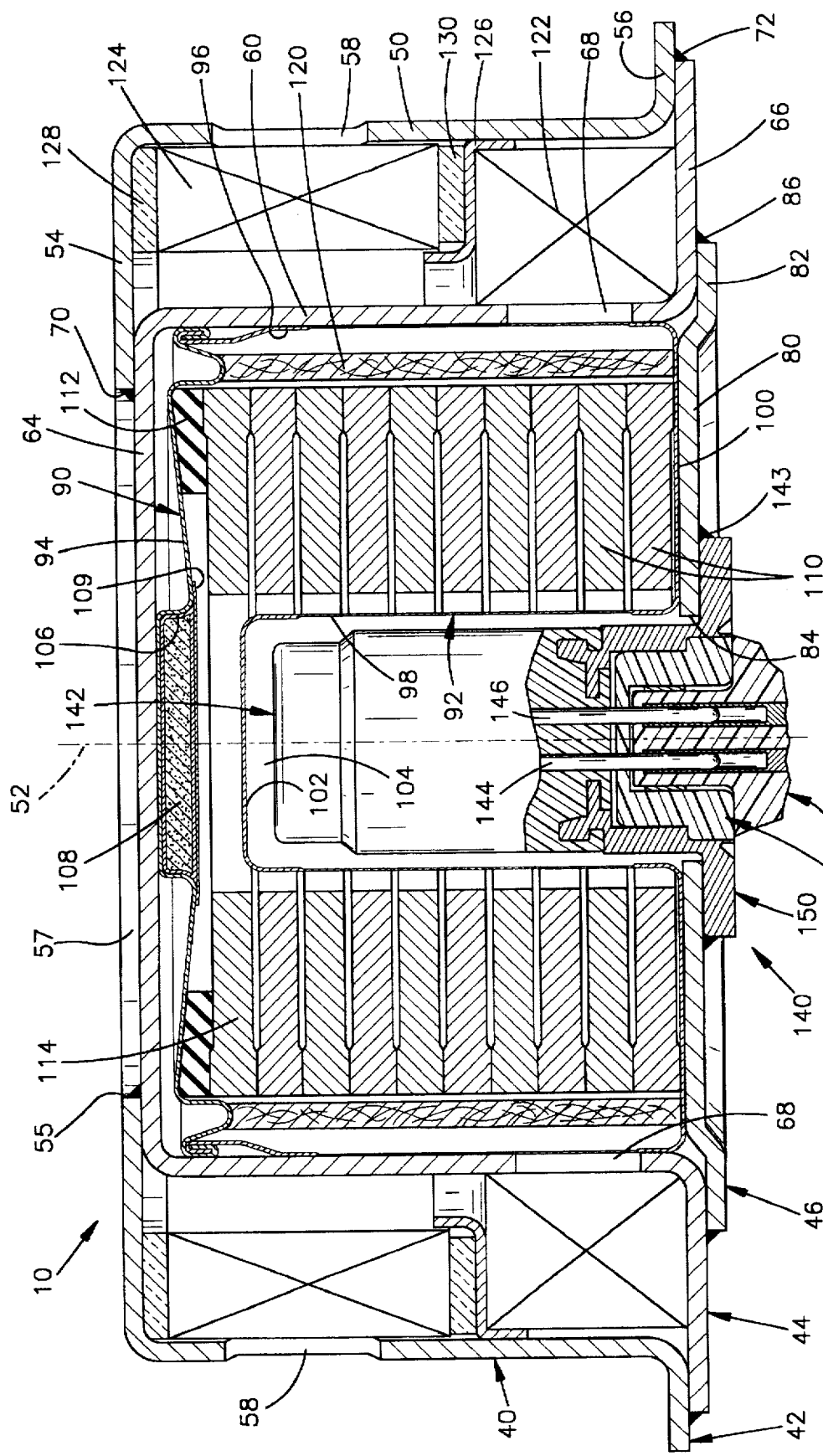
FIG. 2 is a transverse sectional view of the inflator of FIG. 1 and illustrating an electrical connector of the vehicle circuitry.
Figure 4:
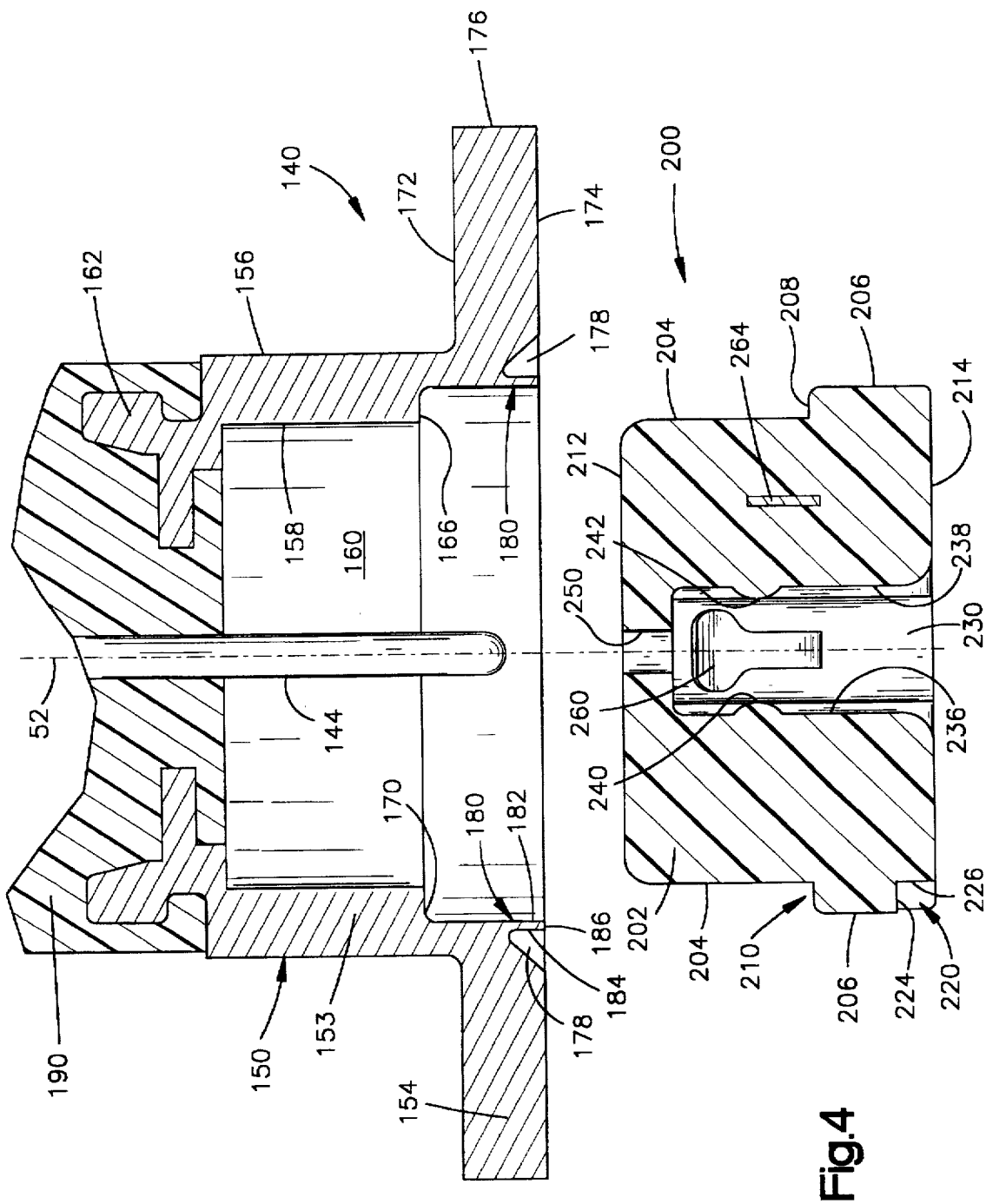
FIG. 4 is a sectional view illustrating portions of the initiator assembly in a condition prior to assembly of the shorting clip into the retainer
Figure 5:
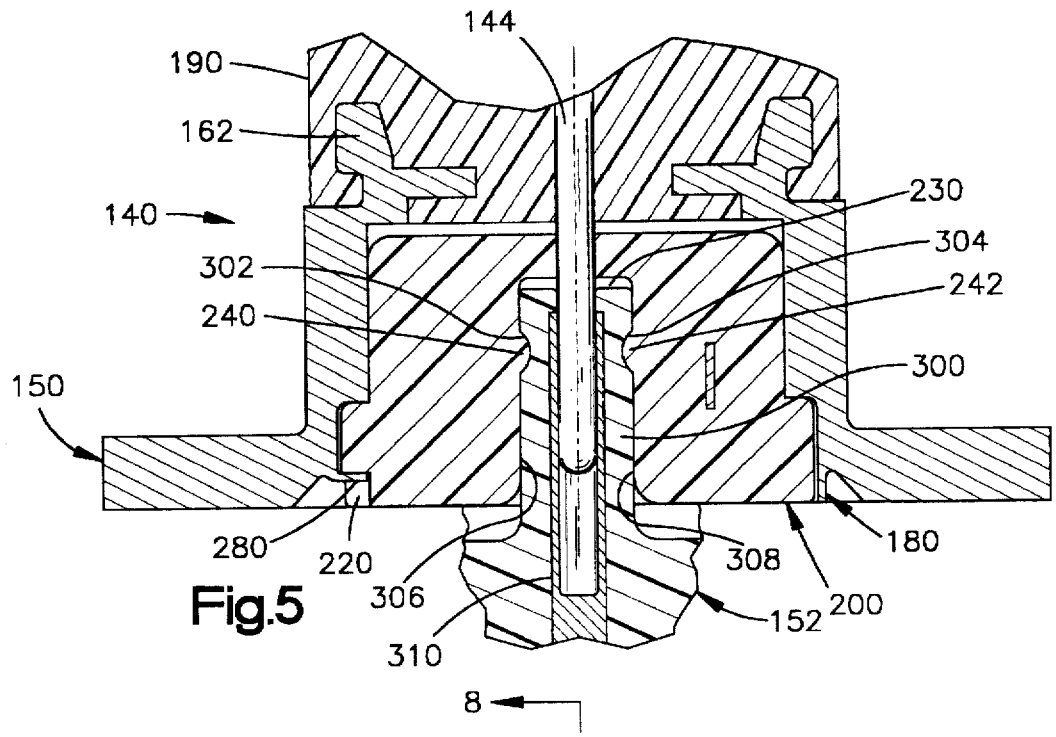
FIG. 5 is a sectional view taken along line 5—5 of FIG. 3 and illustrating the electrical connector in position on the initiator assembly.

The crimp portion 180 of the retainer 150 blocks movement of the shorting clip 200 in a downward direction as viewed in FIGS. 2 and 4, out of the central opening 160 in the retainer 150. The crimp portion 180 thus holds the shorting clip 200 in position axially relative to the igniter 142 and maintains the shorting clip in electrical contact with the electrical terminals 144 and 146 of the igniter 142. The segments 280 and 282 of the crimp portion 180 of the retainer 150 also block rotational movement of the shorting clip 200 relative to the retainer.

When the inflator 10 is mounted in the vehicle, the inflator is electrically connected to the vehicle electric circuitry by the electrical connector 152. The electrical connector 152 has a projecting portion 300, made of an electrically insulating material such as plastic. A pair of locking grooves 302 and 304 are formed on opposite facing side surfaces 306 and 308, respectively, of the projecting portion 300 of the electrical connector 152. Two split cylindrical metal sleeves 310 are molded into the projecting portion 300 of the electrical connector 152. The metal sleeves 310 and 312 connect to lead wires (not shown) which extend away from the electrical connector 152 and which are connectable to vehicle circuitry, including the sensor, for generating an actuating signal for the igniter 142.

The projecting portion 300 of the electrical connector 152 fits into the central opening 230 in the shorting clip 200. The metal terminals 144 and 146 of the igniter 142 are received in the metal sleeves 310 of the electrical connector 152 to establish electrical contact between the igniter 142 and the vehicle electric circuitry. At the same time, the projecting portion 300 of the electrical connector 152 spreads apart the shorting arms 260 and 262 of the shorting clip 200 to disconnect the short circuit established by the shorting clip 200.

The external configuration of the projecting portion 300 of the electrical connector 152 is adapted to interlock with the internal configuration of the shorting clip 200, that is, with the surfaces which define the central opening 230 in the shorting clip. With the projecting portion 300 of the electrical connector 152 disposed in the central opening 230 in the shorting clip 200, the rib 240 on the inner side surface 236 of the shorting clip fits into the groove 302 on the outer side surface 306 of the projecting portion of the electrical connector. Similarly, the rib 242 on the inner side surface 238 of the shorting clip 200 fits into the groove 304 on the outer side surface 308 of the projecting portion 300 of the electrical connector 152. The engagement between the ribs 240 and 242 on the shorting clip 200 and the grooves 302 and 304 on the electrical connector 152, respectively, resists movement of the electrical connector axially outwardly of the inflator 10, that is, in a direction away from the igniter 142. Thus, the interlocking engagement between the shorting clip 200 and the electrical connector 152 maintains the electrical connector in electrical contact with the electrical terminals 144 and 146 of the igniter 142.

The construction of the inflator 10 is such that the inflator is suitable for use in different vehicles. Different vehicles in which the inflator 10 can be mounted can include electrical connectors having a configuration different from the configuration of the electrical connector 152. Because the shorting clip 200 is specifically configured to receive and to interlock with the electrical connector 152, a differently configured electrical connector likely would not interlock with the shorting clip 200. Thus, the differently configured electrical connector likely would not be maintained in electrical contact with the electrical terminals 144 and 146 of the inflator 10.

Figure 6:
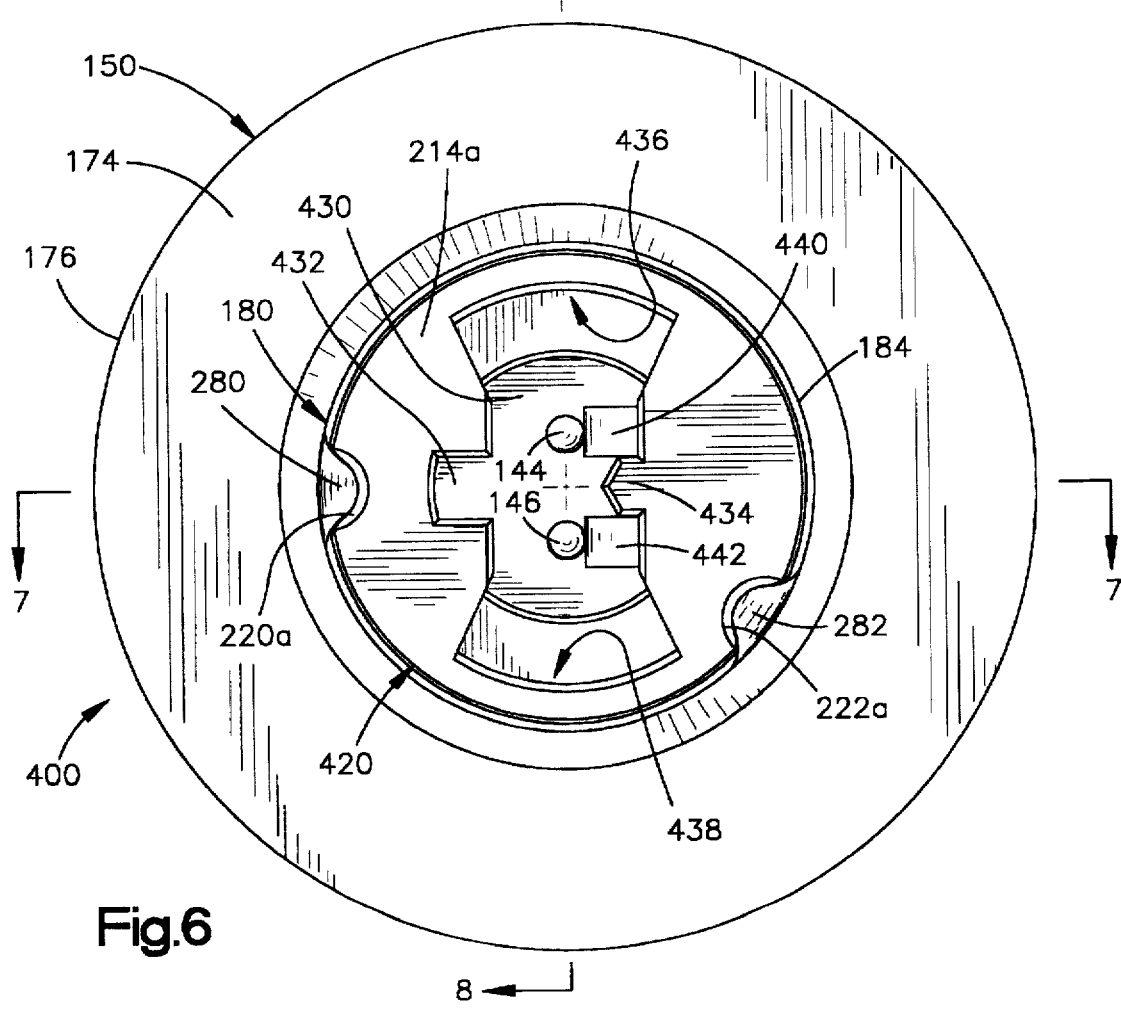
FIG. 6 is a view similar to FIG. 3 of a second initiator assembly which is usable with the inflator of FIG. 1.

Accordingly, the inflator 10 alternatively can include, in place of the initiator assembly 140, an initiator assembly 400 as described below with reference to FIGS. 6–8. The initiator assembly 400 includes a shorting clip 420 which has an internal configuration different from that of the shorting clip 200. As a result, the initiator assembly 400 can be connected with an electrical connector 410 which has a configuration different from the configuration of the electrical connector 152.

The parts of the initiator assembly 400 other than the shorting clip 420 are the same as the corresponding parts of the initiator assembly 140. Specifically, the initiator assembly 400 includes an identical retainer 150, an identical igniter 142 including the terminals 144 and 146, and an identical body of plastic material 190.

The shorting clip 420 has the same external configuration as the shorting clip 200 (FIGS. 1–5). As a result, the shorting clip 420 is engageable with the retainer 150 in the same manner as the shorting clip 200. The external surfaces of the shorting clip 420 are designated with the same reference numerals (with the suffix "a" added) as the corresponding external surfaces of the shorting clip 200.

The shorting clip 420 has a central opening 430 with a configuration different from the configuration of the central opening 230 of the shorting clip 200. An orientation recess 432 (FIG. 6) and an orientation projection 434 provide for proper orientation of the electrical connector 410 in the central opening 430 of the shorting clip 420. A pair of locking recesses 436 and 438 extend outward from the central opening 430 of the shorting clip 420, at locations spaced apart 180° from each other.

The shorting clip 420 includes a pair of spaced metal shorting arms 440 and 442 which extend into the central opening 430 of the shorting clip. The shorting arms 440 and 442 are electrically interconnected by a metal connector portion 444. The shorting arms 440 and 442 are adapted to engage the electrical terminals 144 and 146 of the igniter 142 when the shorting clip 420 is associated with the retainer 150.

The electrical connector 410 has a projecting portion 450. The external configuration of the projecting portion 450 of the electrical connector 410 is adapted to interfit with the internal configuration of the shorting clip 420, that is, with the inner side surfaces which define the central opening 430 of the shorting clip. The electrical connector 410 includes a pair of spaced locking wings 460 and 462 which are adapted to engage in the locking recesses 436 and 438 in the shorting clip 420 and to interlock the electrical connector 410 with the shorting clip 420. A pair of split metal sleeves 452 and 454 are disposed in the projecting portion 450 of the electrical connector 410. The split metal sleeves 452 and 454 are electrically connected with the vehicle electric circuitry for receiving an electric signal for actuation of the igniter 142 when the electrical connector 410 is electrically connected with the terminals 144 and 146 of the igniter.

When a particular inflator 10 is manufactured for eventual association with a vehicle including an electrical connector 410, the shorting clip 420 is inserted in the central opening 160 in the retainer 150, shortly after the process of molding the initiator assembly 400 is completed. The external surfaces of the shorting clip 420 engage the internal surfaces of the retainer 150, that is, the surfaces which define the central opening 160 in the retainer. The shorting clip 420 is secured in the initiator assembly 400 by crimping or bending of the crimp portion 180 of the retainer 150, in the same manner that the shorting clip 200 (FIGS. 2–5) is secured in the initiator assembly 140. The crimp portion 180 of the retainer 150 blocks movement of the shorting clip 420 out of the central opening 160 in the retainer 150, and maintains the shorting clip in electrical contact with the electrical terminals 144 and 146 of the igniter 142.

When the shorting clip 420 is disposed in the central opening 160 in the retainer 150, the electrical terminals 144 and 146 extend into the central opening 430 of the shorting clip. The metal shorting arms 440 and 442 of the shorting clip 420 engage the electrical terminals 144 and 146 of the igniter 142, respectively, and connect them electrically. This connection establishes a short circuit between the electrical terminals 144 and 146 of the igniter 142, when the electrical connector 410 is not in electrical contact with the terminals. Accordingly, any stray electrical current which might be applied across the electrical terminals 144 and 146 of the igniter 142 does not result in actuation of the ignition material in the igniters and thus does not result in actuation of the inflator 10.

After the inflator 10 is mounted in the vehicle which includes the electrical connector 410, the inflator is electrically connected to the vehicle electric circuitry by the electrical connector. The projecting portion 450 of the electrical connector 410 fits into the central opening 430 in the shorting clip 420. The metal terminals 144 and 146 of the igniter 142 are received in the metal sleeves 452 and 454 of the electrical connector 410 to establish electrical contact between the igniter 142 and vehicle electric circuitry. At the same time, the projecting portion 450 of the electrical connector 410 pushes the shorting arms 440 and 442 of the shorting clip 420 away from the terminals 144 and 146 to disconnect the short circuit established by the shorting clip.

With the projecting portion 450 of the electrical connector 410 disposed in the central opening 430 in the shorting clip 420, the locking wings 460 and 462 of the electrical connector are received in the locking recesses 436 and 438, respectively, of the shorting clip. The engagement between the shorting clip 420 and the locking wings 460 and 462 on the electrical connector 410 blocks movement of the electrical connector axially outwardly of the inflator 10, that is, in a direction away from the igniter 142. Thus, the interlocking engagement between the shorting clip 420 and the electrical connector 410 maintains the electrical connector in electrical contact with the electrical terminals 144 and 146 of the igniter 142.

It should be understood that shorting clips which are constructed in accordance with the present invention may have a configuration different from those configurations illustrated in the drawings, in order to interlock with electrical connectors different from those shown in the drawings. Also, the engagement between a particular shorting clip and its associated electrical connector need not constitute an engagement between outer side surfaces on the electrical connector and inner side surfaces on the shorting clip. For example, an electrical connector may have inner side surfaces which engage or interlock with outer side surfaces on a shorting clip in order to maintain the electrical connector in electrical contact with the electrical terminals of the igniter.

From the above description of the invention, those skilled in the art will perceive improvements, changes and modifications in the invention. Such improvements, changes and modifications within the skill of the art are intended to be covered by the appended claims.

Having described the invention, we claim:

1. Apparatus for association with an electrical connector and for, when actuated, initiating actuation of an inflator for discharging inflation fluid to inflate a vehicle occupant restraint such as an air bag, said apparatus comprising:

an igniter actuatable to initiate actuation of the inflator in response to receiving an electrical signal, said igniter having a pair of electrical terminals for electrical contact with the electrical connector to receive the electrical signal from the electrical connector;

a retainer for supporting said igniter adjacent the inflator;

a shorting clip for establishing a short circuit between said electrical terminals of said igniter when said electrical connector is not in electrical contact with said electrical terminals; and means for attaching said shorting clip to said igniter, comprising a crimp portion of said retainer which engages said shorting clip to block movement of said shorting clip relative to said retainer.

2. An apparatus as set forth in claim 1 wherein said crimp portion of said retainer has a first condition in which said shorting clip is movable relative to said retainer, said crimp portion being movable from the first condition into a second condition in engagement with said shorting clip to block movement of said shorting clip relative to said retainer.

3. An apparatus as set forth in claim 2 wherein said shorting clip is movable into an opening in said retainer for attachment to said retainer when said crimp portion of said retainer is in the first condition, said crimp portion of said retainer being located at an outer periphery of said opening in said retainer, said crimp portion when in the second condition overlying at least a portion of said opening in said retainer to block movement of said shorting clip out of said opening in said retainer.

4. An apparatus as set forth in claim 3 wherein said crimp portion of said retainer comprises a bendable cylindrical wall portion of said retainer encircling said opening in said retainer.

5. An apparatus as set forth in claim 1 wherein said shorting clip includes surfaces defining at least one recess in said shorting clip, said crimp portion of said retainer when in the second condition being at least partially disposed in said recess to block movement of said shorting clip in a first direction out of said retainer and to block rotational movement of said shorting clip in a second direction relative to said retainer.

6. An apparatus as set forth in claim 1 wherein said shorting clip includes means for maintaining the electrical connector in electrical contact with said electrical terminals.

7. An apparatus as set forth in claim 1 wherein said shorting clip includes surface means for defining at least one axially extending opening in said shorting clip, said terminals extending into said opening and having portions disposed in said opening for electrical contact with the electrical connector, said shorting clip being adapted to receive the electrical connector in said opening in said shorting clip with said electrical terminals in engagement with the electrical connector, said shorting clip being engageable with the electrical connector to maintain the electrical connector in electrical contact with said electrical terminals.

8. Apparatus for association with an electrical connector and for, when actuated, initiating actuation of an inflator for discharging inflation fluid to inflate a vehicle occupant restraint such as an air bag, said apparatus comprising:

an igniter actuatable to initiate actuation of the inflator in response to receiving an electrical signal, said igniter having a pair of electrical terminals for electrical contact with the electrical connector to receive the electrical signal from the electrical connector;

means for supporting said igniter adjacent the inflator;

a shorting clip for establishing a short circuit between said electrical terminals of said igniter when said electrical connector is not in electrical contact with said electrical terminals; and means for attaching said shorting clip to said igniter;

said shorting clip including means for maintaining the electrical connector in electrical contact with said electrical terminals, comprising inner side surfaces on said shorting clip, said inner side surfaces having a first configuration adapted to enable said shorting clip to be interlocked with outer side surfaces on the electrical connector to block movement of the electrical connector relative to said shoring clip thereby to maintain the electrical connector in electrical contact with said electrical terminals.

9. An apparatus as set forth in claim 8 wherein said shorting clip has a central opening adapted to receive and interlock with the electrical connector, the electrical connector having a projecting portion which is adapted to be received in said central opening in said shorting clip and to interlock with said shorting clip.

10. Apparatus for selective association either with a first electrical connector or with a second electrical connector which is configured differently from the first electrical connector, said apparatus for, when actuated by an electrical signal from the selected electrical connector, initiating actuation of an inflator for discharging inflation fluid to inflate a vehicle occupant restraint such as an air bag, said apparatus comprising:

an igniter actuatable to initiate actuation of the inflator in response to receiving the electrical signal, said igniter having a pair of electrical terminals for electrical contact with the selected electrical connector to receive the electrical signal from the selected electrical connector;

a retainer for supporting said igniter adjacent the inflator; and a plurality of shorting clips selectively engageable with said retainer;

said plurality of shorting clips including a first shorting clip for association with the first electrical connector, said first shorting clip having inner side surfaces with a first configuration adapted to enable said first shorting clip to engage the first connector, said first shorting clip having outer side surfaces;

said plurality of shorting clips including a second shorting clip for association with the second electrical connector, said second shorting clip having inner side surfaces with a second configuration different from the first configuration and adapted to enable said second shorting clip to engage the second connector, said second shorting clip having outer side surfaces with the same configuration as said outer side surfaces of said first shorting clip;

said first shorting clip being selectively engageable with said retainer to establish a short circuit between said electrical terminals of said igniter when said apparatus is to be associated with the first electrical connector and when the first electrical connector is not in electrical contact with said electrical terminals, said outer side surfaces on said first shorting clip being engageable with inner side surfaces on said retainer, when said first shorting clip is engaged with said retainer, to block movement of said first shorting clip relative to said retainer;

said second shorting clip being selectively engageable with said retainer to establish a short circuit between said electrical terminals of said igniter when said apparatus is to be associated with the second electrical connector and when the second electrical connector is not in electrical contact with said electrical terminals, said outer side surfaces on said second shorting clip being engageable with said inner side surfaces on said retainer, when said second shorting clip is engaged with said retainer, to block movement of said second shorting clip relative to said retainer.

11. An apparatus as set forth in claim 10 wherein:

said outer side surfaces of said first shorting clip define a generally cylindrical external configuration of said first shorting clip adapted to fit into a generally cylindrical opening in said retainer, said inner side surfaces of said first shorting clip defining a central opening in said first shorting clip for receiving the first electrical connector, said inner side surfaces of said first shorting clip being engageable with outer side surfaces on the first electrical connector when the first electrical connector is received in said central opening in said first shorting clip for blocking movement of the first electrical connector relative to said first shorting clip; and said outer side surfaces of said second shorting clip define a generally cylindrical external configuration of said second shorting clip adapted to fit into a generally cylindrical opening in said retainer, said inner side surfaces of said second shorting clip defining a central opening in said second shorting clip for receiving the second electrical connector, said inner side surfaces of said second shorting clip being engageable with outer side surfaces on the second electrical connector when the second electrical connector is received in said central opening in said second shorting clip for blocking movement of the second electrical connector relative to said second shorting clip.

12. An apparatus as set forth in claim 10 wherein said inner side surfaces on said retainer comprise inner side surfaces on a bendable crimp portion of said retainer which is movable between a first condition spaced apart from said first shorting clip when said first shorting clip is not engaged with said retainer to a second condition in blocking engagement with said first shorting clip to block movement of said first shorting clip relative to said retainer, said bendable crimp portion of said retainer being movable to a condition in blocking engagement with said second shorting clip to block movement of said second shorting clip relative to said retainer when said second shorting clip is engaged with said retainer.

13. Apparatus for association with an electrical connector and for, when actuated, initiating actuation of an inflator for discharging inflation fluid to inflate a vehicle occupant restraint such as an air bag, said an apparatus comprising:

an igniter actuatable to initiate actuation of the inflator in response to receiving an electrical signal, said igniter having a pair of electrical terminals for electrical contact with the electrical connector to receive the electrical signal from the electrical connector;

means for supporting said igniter adjacent the inflator;

a shorting clip for establishing a short circuit between said electrical terminals of said igniter when said electrical connector is not in electrical contact with said electrical terminals; and means for attaching said shorting clip to said igniter;

said shorting clip including means for maintaining the electrical connector in electrical contact with said electrical terminals;

wherein said means for attaching said shoring clip to said igniter comprises a crimp portion of said retainer which engages said shorting clip to block movement of said shorting clip relative to said retainer.

* * * * *